United States Patent Office 2,848,349
Patented Aug. 19, 1958

2,848,349

FLAME SPRAYING PROCESS

Harold L. Rechter and Marvin Eisenberg, Chicago, Ill., assignors to Armour Research Foundation of Illinois Institute of Technology, Chicago, Ill., a corporation of Illinois No Drawing. Application August 2, 1955
Serial No. 526,084

8 Claims. (Cl. 117—46)

The present invention pertains to improvements in the field of coating articles, particularly metals, to supply thereto oxidation resistant, adherent coatings.

One of the principal fields of application of the present invention is the coating of metal surfaces to increase the oxidation resistance of the metal or to increase its resistance to attack by acids or products of combustion. As an example of the latter, the coatings of the present invention may be applied on engine parts which must come into contact with the highly corrosive lead oxide produced by the combustion of gasoline containing tetraethyl lead.

The coatings of the present invention are the ceramic type, and include the combination of lithium aluminate ($Li_2Al_2O_4$) and zirconia. This combination has been found to be particularly successful as an oxidation resistant, inert coating which becomes readily bonded to metals, glass, and various other materials. In this respect, the coatings differ from ordinary glass type ceramic materials which can be adhered to metals only with great difficulty.

An object of the present invention is to provide a method for coating objects of various descriptions to provide such objects with inert, oxidation resistant coatings.

A still further object of the invention is to provide a method of depositing a coherent, adherent protective coating onto metal objects and the like.

Still another object of the invention is to provide a method for applying thin, adherent oxidation resistant coatings to metals and the like in a rapid and convenient manner.

A further object of the present invention is to provide improved coatings which function to provide oxidation and corrosion resistance to metals.

In the coating method of the present invention, the article to be coated is subjected to the action of a high temperature flame of the type produced, for example, by a blowpipe. While the flame is directed at the object to be coated, a combination including lithium aluminate and zirconia, in finely divided powder form, is injected into the flame becoming deposited on the object as an adherent, inert coating.

The coatings of the present invention are markedly superior to those produced by applying various glass compositions, even with the flame spraying method, onto a base. This difference in properties may be accounted for by a difference in the atomic structures of the coatings produced according to this invention and those produced by spraying fused glass composition onto the same objects. Glass coatings are amorphous in structure while X-ray diffraction data taken on the coatings of the present invention indicate that such coatings are crystalline. Apparently, during the flame spraying operation, lithium aluminate reacts with the zirconia to produce a reaction product because the properties of the coating which result are substantially different from those produced when either of the two ingredients are used alone.

The coatings produced according to the present invention are highly refractory and adherent. If properly applied, the compositions cannot be remelted with an oxyacetylene torch and can be quenched in cold water from red heat without injury. A microscopic examination of the coating in a thin section reveals a fine grained, dense structure. This type of coating offers unusually good resistance to various types of corrosion including that caused by molten metals, salts and products of combustion.

The proportions employed in the coating composition may vary, depending upon the nature of the coating desired. In most cases, however, the lithium aluminate will be present in amounts from 0.001 to 0.1 times the amount of zirconia present in the mixture being flame sprayed.

The coating composition may consist simply of the powdered mixture of lithium aluminate and zirconia, the particles having a size less than about 100 mesh. However, improved results are obtained if a small amount of the zirconia is replaced by calcium fluoride. The zirconia preferably contains about 2 to 5% of calcium fluoride prior to mixing the zirconia with the lithium aluminate. In order to secure a more homogeneous mixture of the calcium fluoride and the zirconia, it is preferable to blend the two compounds and fire the mixture at a temperature between 1500° F., and the melting point of the fluoride. Apparently, at this temperature, some reaction takes place between the oxide and the fluoride resulting in the production of the oxy-fluoride. The product is then ground into a powder having a particle size less than about 100 mesh for injection into the flame spraying apparatus with the similarly sized lithium aluminate.

The zirconia employed in this process should preferably be of the "stabilized" type. The stabilized zirconia is an article of commerce, usually containing from about three to six percent by weight of calcium oxide or magnesium oxide.

Additional benefits are achieved if a small amount of metallic aluminum powder is included in the mixture being flame sprayed. For example, a composition containing 2% of 80 mesh lithium aluminate, 10% aluminum powder, and the balance 65 mesh stabilized zirconia provided excellent oxidation protection to a mild steel rod for 70 hours at 1500° F. Generally, the amount of aluminum may vary from about 1% to about 20% by weight.

The equipment used to apply the flame sprayed coating may be any of a variety of forms. The simplest consists of ordinary blowpipe which is modified by the inclusion of a feed hopper in the oxygen line to permit injection of the finely divided particulated mixture of the lithium aluminate and the zirconia, with or without the addition of calcium fluoride, into the flame while the flame is directed at the object to be coated. The flame temperature may vary from about 1700° C. to about 3000° C. For most uses, the coatings will vary in thickness from about 1 micron to about 0.050 inch. Thickness greater than the indicated maximum may be achieved, if desired, but generally provide no additional benefit. The best coatings apparently occur when the tip of the torch is held between 2 and 3 inches from the surface to be coated.

The process of the present invention has been successfully practiced on a wide variety of base materials. For example, refractory, adherent coatings have been applied on materials such as steel, cast iron, corrosion resistant alloys, copper, aluminum, molybdenum, and "Pyrex" glass.

In becoming deposited upon the surface of the article, the refractory particles undergo a substantial temperature drop so that despite the high temperature of the flame, the temperature at the surface of the article being coated need not be excessive. As an example, a Pyrex tube filled with water can be effectively coated with the coatings of the present invention without cracking the tube and without boiling the water.

In preparing articles for the reception of the improved coatings, it is advisable to roughen the surface to be coated in order to achieve the best results. The roughened surface provides for a better mechanical bonding although this is not the only mechanism by which the coatings adhere to the base. There is also definite evidence of molecular bonding between the flame sprayed coatings and the underlying base material. This is a distinct advantage because it is not absolutely essential that the coefficients of thermal expansion of the coating and the base material be identical. The existence of a molecular bonding is indicated, for example, by the fact that the coatings cannot be flaked off without damaging the base metal itself. Even when the coated article is subjected to excessive stresses so that failure occurs, the failure occurs in the coating itself rather than at the interface, so that the surface of the metal remains protected at all times.

The coatings of the present invention have excellent scratch resistance. The coatings also have good resistance to wetting by molten metals as well as excellent resistance to oxidative corrosion and high temperatures.

From the foregoing, it will be apparent that the coatings of the present invention provides substantial improvements in the protection of metals and other surfaces from attack by various agents. It will also be apparent that numerous modifications can be made to the described embodiments without departing from the scope of the present invention.

We claim as our invention:

1. The method of coating an object with an adherent coating which comprises directing a high temperature flame at said object and injecting into said flame a particulated mixture comprising lithium aluminate and zirconia.

2. The method of coating an object with an adherent coating which comprises directing a high temperature flame at said object and injecting into said flame a particulated mixture comprising lithium aluminate and zirconia, said mixture having a particle size of less than 100 mesh.

3. The method of coating an object with an adherent coating which comprises directing a high temperature flame at said object and injecting into said flame a mixture of lithium aluminate and a finely divided substantially homogeneous mixture of zirconia and calcium fluoride.

4. The method of coating an object with an adherent coating which comprises firing a mixture of zirconia and calcium fluoride, combining the fired mixture in powdered form with powdered lithium aluminate injecting the resulting mixture into a high temperature flame and directing said flame at the object to be coated.

5. The method of coating an object which comprises forming a mixture of zirconia and calcium fluoride, firing the resulting mixture, grinding the fired mixture to produce particles of a size less than about 100 mesh, combining the resulting particles with particles of lithium aluminate also having a particle size less than about 100 mesh, injecting the resulting particle mixture into a high temperature flame and directing said flame at the object to be coated.

6. A flame spraying composition comprising a particulated mixture of lithium aluminate and zirconia.

7. A flame spraying composition comprising a particulated mixture of lithium aluminate and zirconia, said mixture having a particle size of less than 100 mesh.

8. A coated body comprising a base material coated with a crystalline reaction product of lithium aluminate and zirconia, said reaction product having been produced by joint injection of particles of lithium aluminate and zirconia into a high temperature flame directed at said base material.

References Cited in the file of this patent

UNITED STATES PATENTS

| | | |
|---|---|---|
| Re. 22,011 | Kinzie | Jan. 20, 1942 |
| 2,686,134 | Wooding | Aug. 10, 1954 |
| 2,707,691 | Wheildon | May 3, 1955 |
| 2,711,975 | Wainer | June 28, 1955 |
| 2,757,105 | Terry | July 31, 1956 |